United States Patent
Zhou et al.

(10) Patent No.: US 8,709,284 B2
(45) Date of Patent: Apr. 29, 2014

(54) ZNO GREEN LUMINESCENT MATERIAL AND ITS PREPARATION

(75) Inventors: Mingjie Zhou, Shenzhen (CN); Wenbo Ma, Shenzhen (CN); Zhaopu Shi, Shenzhen (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 165 days.

(21) Appl. No.: 13/254,862

(22) PCT Filed: Mar. 6, 2009

(86) PCT No.: PCT/CN2009/070670
§ 371 (c)(1),
(2), (4) Date: Mar. 27, 2012

(87) PCT Pub. No.: WO2010/099667
PCT Pub. Date: Sep. 10, 2010

(65) Prior Publication Data
US 2012/0175560 A1    Jul. 12, 2012

(51) Int. Cl.
*C09K 11/78* (2006.01)
(52) U.S. Cl.
USPC .................................................. 252/301.6 R
(58) Field of Classification Search
USPC .................................................. 252/301.6 R
See application file for complete search history.

(56) References Cited

FOREIGN PATENT DOCUMENTS

JP        08-236275    *    9/1996

OTHER PUBLICATIONS

Chen et al, "Optical properties of trivalent europium doped ZnO:Zn phosphor under indirect excitation of near-UV light", Optica Express, vol. 16, No. 16, Jul. 2008; pp. 11795-11801.*
International Search Report for PCT Patent Application No. PCT/CN2009/070670.

* cited by examiner

*Primary Examiner* — Carol M Koslow

(57) ABSTRACT

The present invention relates to ZnO green luminescent material and its preparation. The ZnO green luminescent material is prepared by doping a trivalent rare earth ion compound and a Li compound into zinc oxide material. The method comprises the following steps: (1) weighing raw material in the stoichiometric ratio of formula ZnO: xA, yLi, (2) grinding the raw material, sintering it at 800-1200° C. for 2-8 h, cooling to the room temperature, and then obtaining the ZnO green luminescent material. The present ZnO green luminescent material doped with trivalent rare earth ion compound and Li compound has high stability and luminous intensity, and has higher low-voltage cathode ray luminescence efficiency. The method can easily be operated and can be used widely.

3 Claims, 2 Drawing Sheets

ZNO GREEN LUMINESCENT MATERIAL AND ITS PREPARATION

FIELD OF THE INVENTION

The present invention relates to luminescent material and its preparation, in particular to zinc oxide green luminescent material and its preparation.

BACKGROUND OF THE INVENTION

Zinc oxide (ZnO), one kind of excellent direct wide bandgap semiconductor luminescent material (Eg=3.37 eV), possesses excellent physicochemical properties and its applications in purple light diodes and laser diodes is strikingly. Meanwhile, ZnO is also efficient green fluorescent powder used in vacuum fluorescent tubes and electroluminescent devices. Compared with the traditional sulfide fluorescent powder, ZnO has advantages including ultraviolet ray resistance and high conductance and so on.

Among the researches on ZnO green fluorescent powder, there are considerable reports referring to zinc-rich zinc oxide green fluorescent powder (ZnO:Zn). However, zinc-rich zinc oxide green fluorescent powder should generally be synthesized through high-temperature calcination in reducing atmosphere and its preparation conditions are quite rigorous. There are also some research reports on the preparation and luminescent properties of sulfur-doped ZnO fluorescent powder. Sulfur-doped ZnO material has been synthesized through simple solution-transformation approach and green light emission is observed as well by shen et al. Nevertheless, sulfur doping has enhanced the exciton emission of ZnO at 380 nm but waken the green emission at 510 nm, which goes against the requirement on the intensity of emitted green light of ZnO green fluorescent powder.

SUMMARY OF THE INVENTION

The objective of the present invention is to provide zinc oxide green luminescent material with high stability, high luminous intensity and higher low-voltage cathode ray luminescence efficiency and its preparation, aiming at the problem of low intensity of green emission of sulfur-doped ZnO green fluorescent powder in the prior art.

Another objective of the present invention is to provide a preparation method for zinc oxide green luminescent material which needs simple technical condition, can be easily operated and can be used widely, aiming at the problem of quite rigorous preparation conditions for the zinc-rich ZnO green fluorescent powder in the prior art.

In a first aspect, a kind of zinc oxide green luminescent material is provided, which is prepared by doping a trivalent rare earth ion compound and a Lithium-ion compound into zinc oxide material.

The molar coefficients x, y of the doped trivalent rare earth ion compound and the Lithium-ion compound are calculated in a stoichiometric ratio of chemical formula ZnO:xA, yLi$^+$; wherein a range of x is $0<x\leq0.05$, a range of y is $0<y\leq0.05$ and A represents the trivalent rare earth ion; in other words, a molar ratio of ZnO:A: Li$^+$ is 1:x:y in raw material, wherein a range of x is $0<x\leq0.05$ and a range of y is $0<y\leq0.05$.

The ranges of the molar coefficients x and y are preferably $0<x\leq0.03$ and $0<y\leq0.03$, respectively.

The trivalent rare earth ion compound is preferably a Thulium ion (Tm$^{3+}$) compound or a Europium ion (Eu$^{3+}$) compound.

The Tm$^{3+}$ compound is oxide, carbonate, nitrate or halide of Tm$^{3+}$, and Eu$^{3+}$ compound is oxide, carbonate, nitrate or halide of Eu$^{3+}$.

In another aspect, a preparation method for zinc oxide green luminescent material is provided, which comprising following steps:

(1) weighing raw material of ZnO, trivalent rare earth ion compound and Li$_+$ compound in a stoichiometric ratio of chemical formula ZnO:xA, yLi$^+$; wherein a range of x is $0<x\leq0.05$, a range of y is $0<y\leq0.05$ and A represents the trivalent rare earth ion;

(2) grinding the weighed raw material uniformly, and sintering the ground raw material at 800-1200° C. for 2-8 h, cooling the sintered raw material to room temperature, and then obtaining the ZnO green luminescent material doped with trivalent rare earth ion and Li$^+$.

The preparation method for zinc oxide green luminescent material preferably comprises following steps:

(1) weighing the raw material of the ZnO, trivalent rare earth ion compound and Lithium-ion compound in the stoichiometric ratio of chemical formula ZnO:xA, yLi$^+$; wherein the range of x is $0<x\leq0.03$, the range of y is $0<y\leq0.03$ and A represents the trivalent rare earth ion;

(2) grinding the weighed raw material uniformly in a mortar, sintering the ground raw material at 900-1100° C. for 4-6 h in an air atmosphere, cooling a generated product to room temperature, and then obtaining the ZnO green luminescent material doped with trivalent rare earth ion and Lithium-ion.

The trivalent rare earth ion compound is preferably a Tm$^{3+}$ compound or a Eu$^{3+}$ compound.

The Tm$^{3+}$ compound is oxide, carbonate, nitrate or halide of Tm$^{3+}$, and Eu$^{3+}$ compound is oxide, carbonate, nitrate or halide of Eu$^{3+}$.

The present ZnO green luminescent material doped with trivalent rare earth ion and Lithium-ion has high stability and luminous intensity, which has been enhanced to about 4 folds compared with that of undoped ZnO luminescent material, and has higher low-voltage cathodoluminescence efficiency.

The method needs simple technical condition, can easily be operated and can be used widely.

BRIEF DESCRIPTION OF THE DRAWINGS

The present invention will be further described with reference to the accompanying drawings and embodiments in the following. In the Figures.

Wherein, the photoluminescence spectrum is detected by the usage of SHIMADZU RF-5301PC fluorescence spectrophotometer, the excitation wavelength of which is 350 nm.

The test condition for the cathodoluminescence spectrum is as follows: the excitation voltage is 5 kV and the beam current is 8 μA.

DETAILED DESCRIPTION OF THE PREFERRED EMBODIMENT

Example 1

ZnO:0.005Tm$^{3+}$,0.005Li$^+$ (x=0.005, y=0.005) Prepared by High Temperature Solid Phase Method 1 mmol ZnO, 0.005 mmol Tm$_2$O$_3$ and 0.005 mmol Li$_2$CO$_3$ are placed in an agate mortar and ground to be uniformly mixed at room temperature. Then the powder is transferred to a corundum crucible and placed in a high temperature box-type furnace to be sintered at 900° C. for 4 h. The sintered product is then placed in a mortar and ground to be uniform after cooling to room temperature and the green emission fluorescent powder ZnO:Tm$^{3+}$,Li$^+$ is obtained therewith, which emits green light when excited by a light at 350 nm or a low-voltage cathode ray.

Example 2

Figure 1:
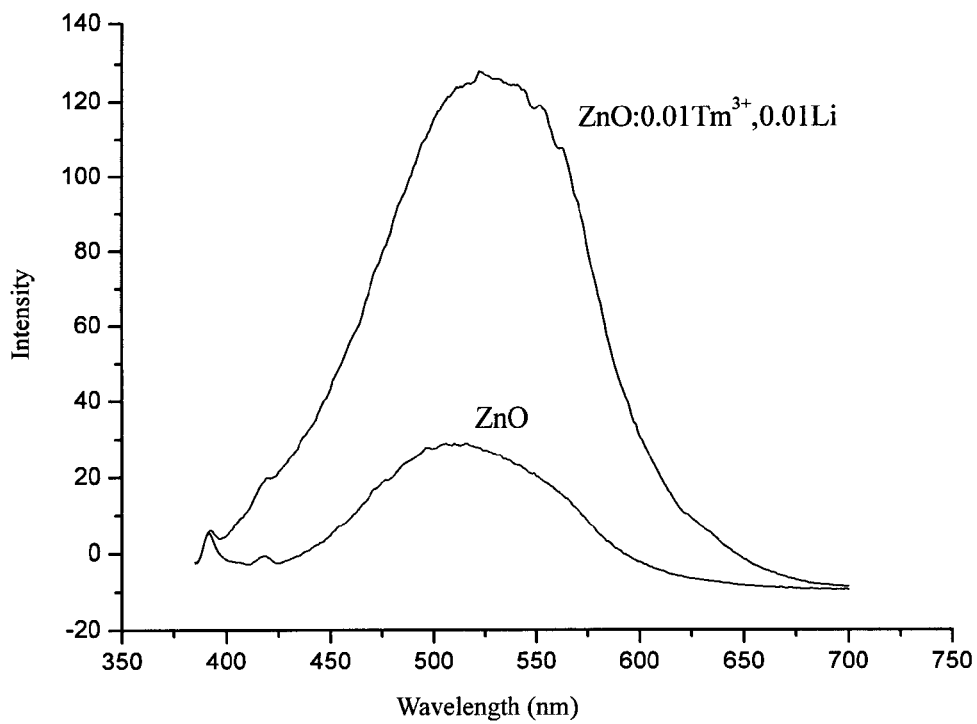
FIG. 1 is the compared photoluminescence spectrum between the ion-doped ZnO green luminescent material and the no ion-doped ZnO luminescent material prepared in example 2.
Figure 2:
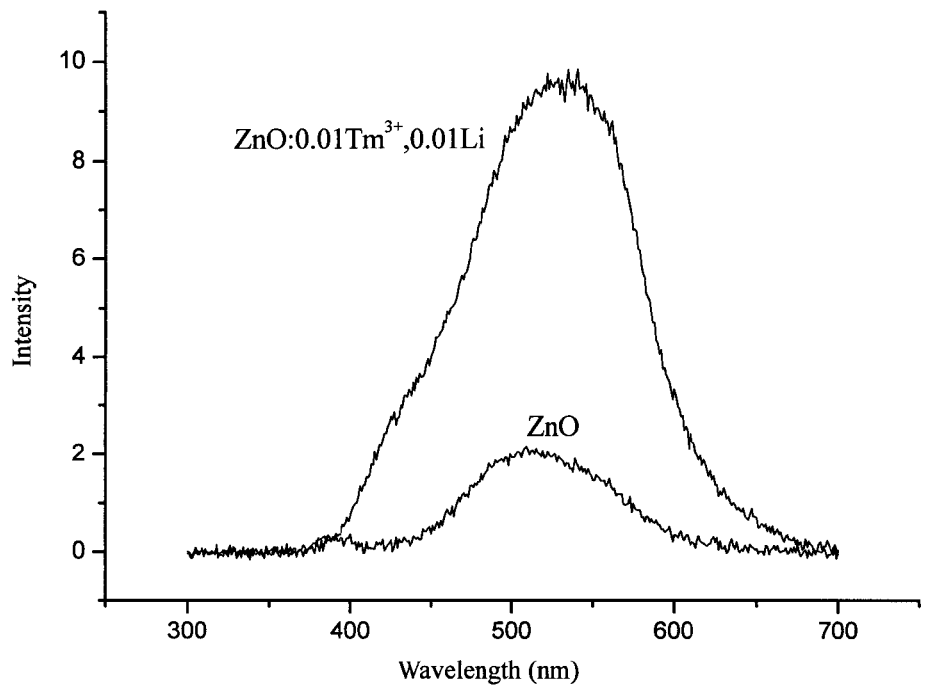
FIG. 2 is the compared cathodoluminescence spectrum between the ion-doped ZnO green luminescent material and the no ion-doped ZnO luminescent material prepared in example 2.

ZnO:0.01Tm$^{3+}$, 0.01Li$^+$ (x=0.01, y=0.01) Prepared by High Temperature Solid Phase Method 1 mmol ZnO, 0.01 mmol Tm$_2$O$_3$ and 0.01 mmol Li$_2$CO$_3$ are placed in an agate mortar and ground to be uniformly mixed at room temperature. Then the powder is transferred to a corundum crucible and placed in a high temperature box-type furnace to be sintered at 1200° C. for 2 h. The sintered product is then placed in a mortar and ground to be uniform after cooling to room temperature and the green emission fluorescent powder ZnO:Tm$^{3+}$, yLi$^+$ is obtained therewith, which emits green light when excited by a light at 350 nm or a low-voltage cathode ray. As shown in FIG. 1, it is the compared photoluminescence spectrum between the ZnO green luminescent material doped with Tm$^{3+}$ and Li$^+$ and the no ion-doped ZnO luminescent material. It can be seen from the figure that after the doping of Tm$^{3+}$ and Li$^+$, the green luminous intensity of ZnO has been enhanced to about 4.3 folds compared with that of the material before doping when excited by a light at 350 nm. As shown in FIG. 2, it is the compared cathode ray emission spectrum between the ZnO green luminescent material doped with Tm$^{3+}$ and Li$^+$ and the no ion-doped ZnO luminescent material. It can be seen from the figure that the green luminous intensity of ZnO has been enhanced to about 5 folds compared with that of the material before doping when excited by an accelerating voltage of 7.5 kV.

Example 3

ZnO:0.05Tm$^{3+}$, 0.05Li$^+$ (x=0.05, y=0.05) Prepared by High Temperature Solid Phase Method 1 mmol ZnO, 0.05 mmol Tm$_2$O$_3$ and 0.05 mmol Li$_2$CO$_3$ are placed in an agate mortar and ground to be uniformly mixed at room temperature. Then the powder is transferred to a corundum crucible and placed in a high temperature box-type furnace to be sintered at 800° C. for 8 h. The sintered product is then placed in a mortar and ground to be uniform after cooling to room temperature and the green emission fluorescent powder ZnO:Tm$^{3+}$, yLi$^+$ is obtained therewith, which emits green light when excited by a light at 350 nm or a low-voltage cathode ray.

Example 4

ZnO:0.01Tm$^{3+}$, 0.01Li$^+$ (x=0.01, y=0.01) Prepared by High Temperature Solid Phase Method 1 mmol ZnO, 0.01 mmol Tm$_2$O$_3$ and 0.01 mmol LiF are placed in an agate mortar and ground to be uniformly mixed at room temperature. Then the powder is transferred to a corundum crucible and placed in a high temperature box-type furnace to be sintered at 1100° C. for 6 h. The sintered product is then placed in a mortar and ground to be uniform after cooling to room temperature and the green emission fluorescent powder ZnO:Tm$^{3+}$, Li$^+$ is obtained therewith, which emits green light when excited by a light at 350 nm or a low-voltage cathode ray.

Example 5

ZnO:0.005Eu$^{3+}$, 0.005Li$^+$ (x=0.005, y=0.005) Prepared by High Temperature Solid Phase Method 1 mmol ZnO, 0.005 mmol Eu$_2$O$_3$ and 0.005 mmol Li$_2$CO$_3$ are placed in an agate mortar and ground to be uniformly mixed at room temperature. Then the powder is transferred to a corundum crucible and placed in a high temperature box-type furnace to be sintered at 1000° C. for 5 h. The sintered product is then placed in a mortar and ground to be uniform after cooling to room temperature and a green emission fluorescent powder ZnO:Eu$^{3+}$, Li$^+$ is obtained therewith, which emits green light when excited by a light at 350 nm or a low-voltage cathode ray.

Example 6

Figure 3:
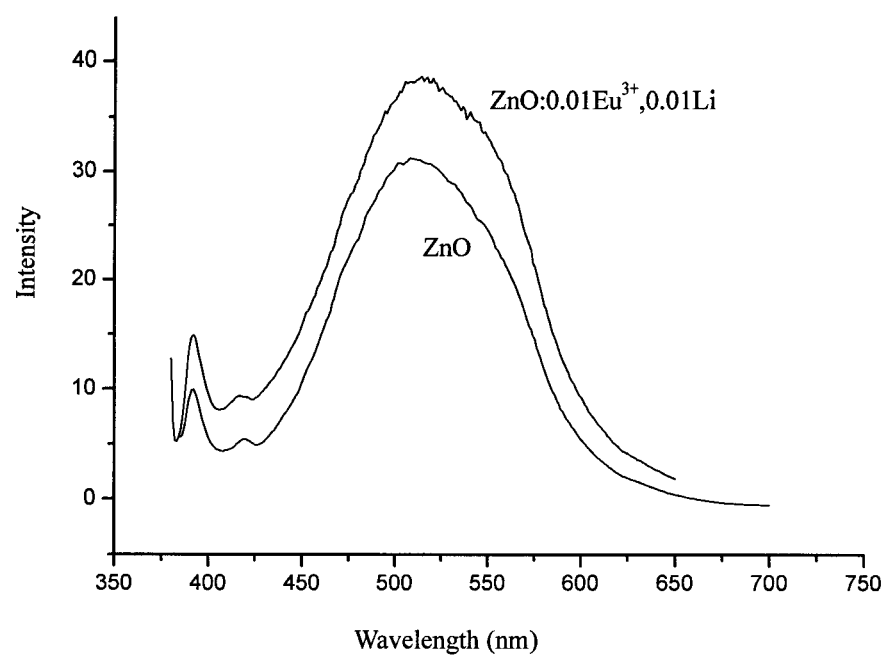
FIG. 3 is the compared photoluminescence spectrum between the ion-doped ZnO green luminescent material and the no ion-doped ZnO luminescent material prepared in example 6.

ZnO:0.01Eu$^{3+}$, 0.01Li$^+$ (x=0.01, y=0.01) Prepared by High Temperature Solid Phase Method 1 mmol ZnO, 0.01 mmol Eu$_2$O$_3$ and 0.01 mmol Li$_2$CO$_3$ are placed in an agate mortar and ground to be uniformly mixed at room temperature. The remaining steps are the same as those in Example 1 and the green emission fluorescent powder ZnO:Eu$^{3+}$,Li$^+$ is obtained therewith, which emits green light when excited by a light at 350 nm or a low-voltage cathode ray. As shown in FIG. 3, it is the compared photoluminescence spectrum between the ZnO green luminescent material doped with Eu$^{3+}$ and Li$^+$ and the no ion-doped ZnO luminescent material. It can be seen from FIG. 3 that after the doping of Eu$^{3+}$ and Li$^+$, the green luminous intensity of ZnO has been enhanced to about 1.3 folds compared with that of the material before doping when excited by a light at 350 nm.

Example 7

ZnO:0.0001Eu$^{3+}$,0.03Li$^+$ (x=0.0001, y=0.03) Prepared by High Temperature Solid Phase Method 1 mmol ZnO, 0.0001 mmol Eu$_2$O$_3$ and 0.03 mmol Li$_2$CO$_3$ are placed in an agate mortar and ground to be uniformly mixed at room temperature. The remaining steps are the same as those in Example 1 and the green emission fluorescent powder ZnO:Eu$^{3+}$,Li$^+$ is obtained therewith, which emits green light when excited by a light at 350 nm or a low-voltage cathode ray.

Example 8

ZnO:0.03Tm$^{3+}$,0.0001Li$^+$ (x=0.03, y=0.0001) Prepared by High Temperature Solid Phase Method 1 mmol ZnO, 0.03 mmol Tm(NO$_3$)$_3$ and 0.0001 mmol LiF are placed in an agate mortar and ground to be uniformly mixed at room temperature. The remaining steps are the same as those in Example 1 and the green emission fluorescent powder ZnO:Tm$^{3+}$, Li$^+$ is obtained therewith, which emits green light when excited by a light at 350 nm or a low-voltage cathode ray.

Example 9

ZnO:0.04Tm$^{3+}$, 0.02Li$^+$ (x=0.04, y=0.02) Prepared by High Temperature Solid Phase Method 1 mmol ZnO, 0.04 mmol TmCl$_3$ and 0.03 mmol LiF are placed in an agate mortar and ground to be uniformly mixed at room temperature. The remaining steps are the same as those in Example 1 and a green emission fluorescent powder ZnO:Tm$^{3+}$, Li$^+$ is obtained therewith, which emits green light when excited by a light at 350 nm or a low-voltage cathode ray.

Example 10

ZnO:0.015Eu$^{3+}$, 0.025Li$^+$ (x=0.015, y=0.025) Prepared by High Temperature Solid Phase Method 1 mmol ZnO, 0.015 mmol Eu(NO$_3$)$_3$ and 0.025 mmol LiCl are placed in an agate mortar and ground to be uniformly mixed at room temperature. The remaining steps are the same as those in Example 1 and the green emission fluorescent powder ZnO:Eu$^{3+}$, Li$^+$ is obtained therewith, which emits green light when excited by a light at 350 nm or a low-voltage cathode ray.

The invention claimed is:

1. A preparation method for zinc oxide green luminescent material,
   wherein the method comprises following steps:
   (1) weighing raw material of zinc oxid, a trivalent rare earth ion compound and a Lithium-ion compound in the stoichiometric ratio of chemical formula ZnO:xA,yLi$^+$; wherein a range of x is 0<x≤0.03, a range of y is 0<y≤0.03 and A represents the trivalent rare earth ion;
   (2) grinding the weighed raw material uniformly in a mortar, and sintering the ground raw material at 900-1100° C. for 4-6 h, cooling the sintered raw material to room temperature, and then obtaining the ZnO green luminescent material doped with trivalent rare earth ion and Lithium-ion.

2. The preparation method for zinc oxide green luminescent material according to claim 1, wherein the trivalent rare earth ion compound is a Tm$^{3+}$ compound or a Eu$^{3+}$ compound.

3. The preparation method for zinc oxide green luminescent material according to claim 2, wherein the Tm$^{3+}$ compound is oxide, carbonate, nitrate or halide of Tm$^{3+}$, and the Eu$^{3+}$ compound is oxide, carbonate, nitrate or halide of Eu$^{3+}$.

* * * * *